(12) United States Patent
Bierweiler et al.

(10) Patent No.: US 9,086,308 B2
(45) Date of Patent: Jul. 21, 2015

(54) METHOD FOR OPERATING A CORIOLIS MASS FLOW RATE METER AND CORIOLIS MASS FLOW RATE METER

(75) Inventors: Thomas Bierweiler, Stutensee (DE); Wolfgang Ens, Linkenheim (DE); Felix Hammacher, Pirmasens (DE); Henning Lenz, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 317 days.

(21) Appl. No.: 13/515,931

(22) PCT Filed: Dec. 14, 2009

(86) PCT No.: PCT/EP2009/067051
§ 371 (c)(1),
(2), (4) Date: Sep. 19, 2012

(87) PCT Pub. No.: WO2011/072711
PCT Pub. Date: Jun. 23, 2011

(65) Prior Publication Data
US 2013/0055827 A1 Mar. 7, 2013

(51) Int. Cl.
*G01F 1/84* (2006.01)
*G01F 1/74* (2006.01)

(52) U.S. Cl.
CPC ............... *G01F 1/8477* (2013.01); *G01F 1/74* (2013.01); *G01F 1/8413* (2013.01); *G01F 1/8431* (2013.01); *G01F 1/8436* (2013.01)

(58) Field of Classification Search
CPC ... G01F 1/8431; G01F 1/8436; G01F 1/8477; G01F 1/8413; G01F 1/74

USPC ...................... 73/861.355–861.357
See application file for complete search history.

(56) References Cited

U.S. PATENT DOCUMENTS

| | | |
|---|---|---|
| 5,926,096 A | 7/1999 | Mattar et al. |
| 6,327,914 B1 | 12/2001 | Dutton |
| 7,421,350 B2 | 9/2008 | Duffill et al. |
| 7,640,813 B2 | 1/2010 | Storm |
| 2003/0070495 A1* | 4/2003 | Kolahi ..................... 73/861.357 |
| 2006/0265148 A1* | 11/2006 | Stack et al. ..................... 702/45 |

(Continued)

FOREIGN PATENT DOCUMENTS

| | | |
|---|---|---|
| CN | 101014835 | 8/2007 |
| DE | 102006017676 | 9/2007 |

(Continued)

*Primary Examiner* — Lisa Caputo
*Assistant Examiner* — Philip Cotey
(74) *Attorney, Agent, or Firm* — Cozen O'Connor

(57) ABSTRACT

A method for operating a Coriolis mass flow rate meter and a Coriolis mass flow rate meter including an evaluation device, a measuring tube having a medium flowing therethrough and which is excited so as to perform oscillations, and at least two spaced oscillation pickups spaced apart in the longitudinal direction of the measuring tube to each generate an oscillation signal, wherein a first indicator variable based on the damping of the oscillations of the measuring tube is initially used to detect deposits in the measuring tube and if, based on the first indicator variable, increased damping is established, a second indicator variable is used, which is based on the manifestation of harmonics in the frequency spectrum of an oscillation signal such that reliable detection of deposits and therefore an indication of the state of meters and pipelines in a process engineering installation are advantageously possible.

7 Claims, 2 Drawing Sheets

(56) References Cited

U.S. PATENT DOCUMENTS

| | | |
|---|---|---|
| 2007/0017274 A1* | 1/2007 | Wheeler et al. ................. 73/1.16 |
| 2007/0028663 A1* | 2/2007 | Patten et al. ................... 73/1.34 |
| 2007/0095153 A1* | 5/2007 | Rieder et al. ............. 73/861.356 |
| 2008/0011101 A1* | 1/2008 | Storm ....................... 73/861.356 |
| 2008/0041168 A1* | 2/2008 | Kolahi et al. ............ 73/861.355 |
| 2008/0141789 A1* | 6/2008 | Kassubek et al. ........ 73/861.356 |
| 2008/0184813 A1* | 8/2008 | Patten et al. ............. 73/861.355 |
| 2008/0302169 A1* | 12/2008 | Patten et al. ................... 73/1.35 |
| 2010/0206090 A1 | 8/2010 | Stack |

FOREIGN PATENT DOCUMENTS

| | | |
|---|---|---|
| EP | 0816807 | 1/1998 |
| EP | 1845346 | 10/2007 |
| WO | WO 0019175 | 4/2000 |
| WO | WO 2007045539 A3 * | 6/2007 |
| WO | WO 2009051588 | 4/2009 |
| WO | WO 2009089839 | 7/2009 |

* cited by examiner

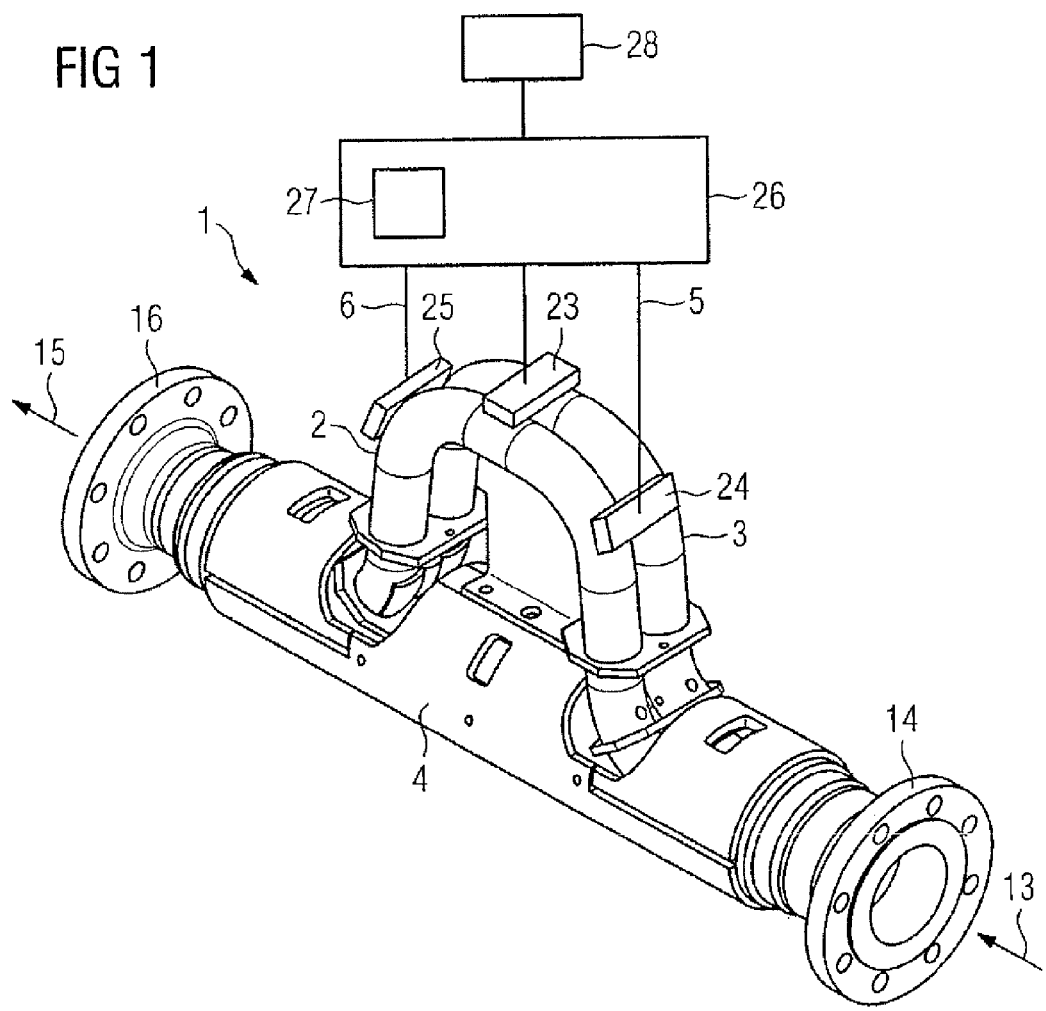

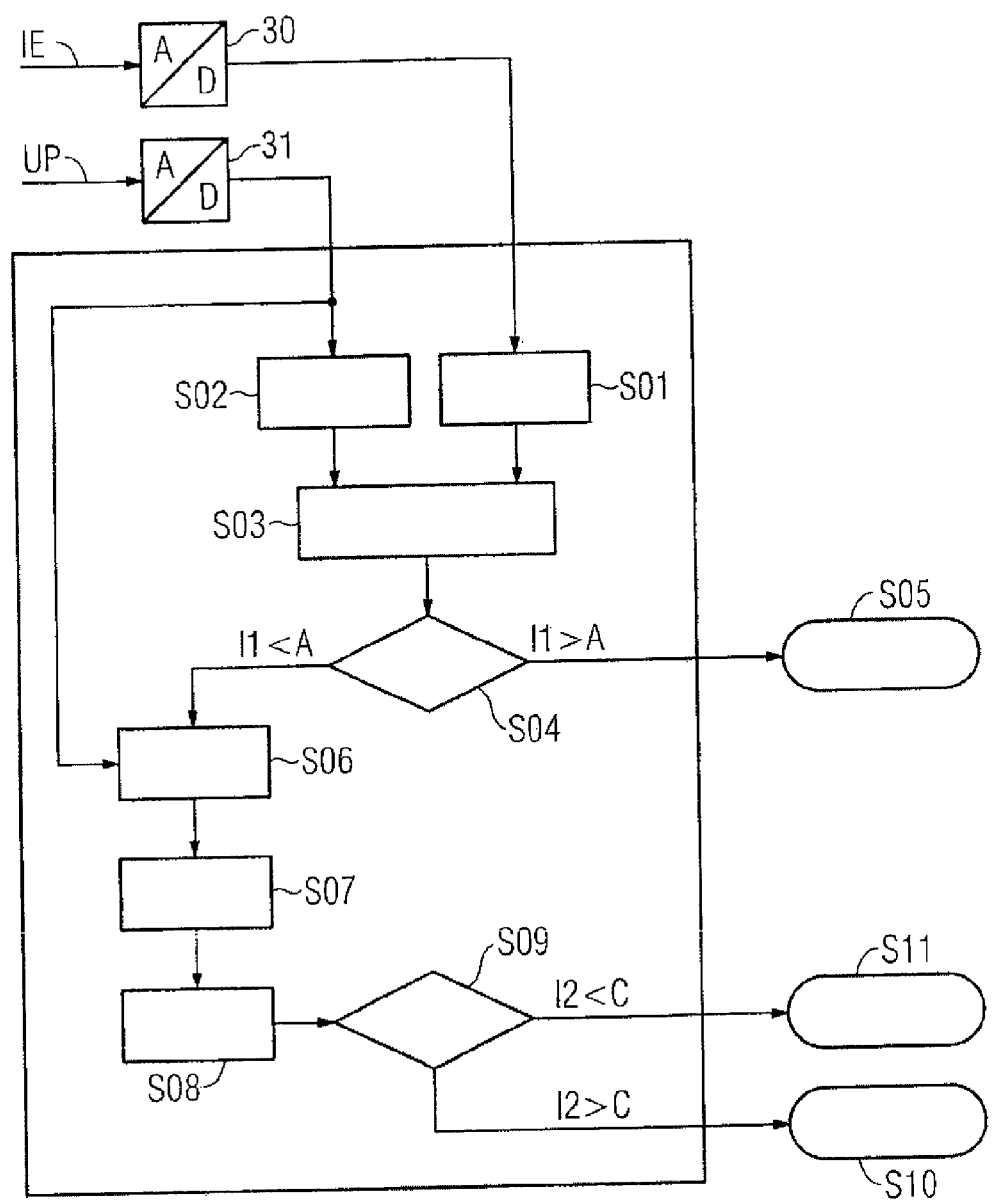

METHOD FOR OPERATING A CORIOLIS MASS FLOW RATE METER AND CORIOLIS MASS FLOW RATE METER

CROSS-REFERENCE TO RELATED APPLICATIONS

This is a U.S. national stage of application No. PCT/EP2009/067051 filed 14 Dec. 2009.

BACKGROUND OF THE INVENTION

1. Field of the Invention

The invention relates to a method for operating a Coriolis mass flow meter and to a Coriolis mass flow meter.

2. Description of the Related Art

In process automation, it is often required to measure the flow rate of a medium through a pipeline. Devices for this purpose are known, such as magnetic-inductive, ultrasonic or float-type flow meters, and similarly vortex flow meters or differential pressure measuring transducers, which work together with a pressure orifice plate in the measuring tube. These meters directly supply a measured value for the flow rate or, taking into consideration the geometry of the measuring tube, for the flow volume. Only Coriolis mass flow meters allow a direct measurement of the mass flow.

In general, Coriolis mass flow meters have a single measuring tube or a number of measuring tubes, such as a pair, through which a medium flows, and of which the mass flow is to be determined. Various arrangements and geometries of the measuring tubes are known for achieving this. For example, Coriolis mass flow meters with a single straight measuring tube and Coriolis mass flow meters with two curved measuring tubes running parallel to one another are conventional devices. The latter measuring tubes, formed identically as a pair, are induced by an excitation system placed in the middle region to vibrate such that they oscillate in opposition to one another, i.e., the vibrations of the two measuring tubes are phase-offset with respect to one another by 180°, to achieve a mass equalization. The position of the center of mass of the system formed by the two measuring tubes thereby remains substantially constant and forces occurring are largely compensated. As a positive consequence, this has the result that the vibrating system has scarcely any external effect as such. Provided upstream and downstream of the excitation system are vibration pickups, between the output signals of which a phase difference can be evaluated as a measuring signal when there is a flow. This is caused by the Coriolis forces prevailing when there is a flow, and consequently by the mass flow. The density of the medium influences the resonant frequency of the vibrating system. Consequently, apart from the mass flow, it is also possible to determine, inter alia, the density of the flowing medium.

WO 2009/089839 A1 discloses a Coriolis mass flow meter with which the undesired state of a multiphase flow can be detected more clearly, and consequently more reliable operation of the meter can be made possible. Information on multiphase flows, such as two-phase flows, in particular the detection of the occurrence of such a multiphase flow as well as findings concerning the manifestation of the multiphase flows, can be obtained in this way. An example of a two-phase flow is that of gas bubbles in a liquid, which may be caused, for example, by cavitation in valves or pumps or the intake of air at leaks of a pipeline system. Furthermore, an example of a two-phase flow is a mixture of solids in a liquid, for example, caused by crystallization or the sudden detachment of deposits in the pipeline system through which the medium flows. A further example is that of mixtures of insoluble liquids, i.e., emulsions, which may be caused, for example, by a change of the medium flowing through the pipeline system.

DE 10 2006 017 676 B3 discloses a method for operating a Coriolis mass flow meter in which a number of indicator variables are determined for the detection of a multiphase flow. For example, for the determination of an indicator variable that is based on frictional losses within the two-phase flow, the drive power required for inducing the measuring tube to vibrate is divided by the root mean square value of a vibration signal. For determination of another indicator variable, a frequency spectrum of the signals sensed by the vibration pickups is analyzed. Deviations of a spectrum determined during the operation of the Coriolis mass flow meter from a previously established, nominal spectrum are used for the calculation of the further indicator variable for the detection of a multiphase flow.

Many process automation applications involve transporting media, which over time form deposits or adhering attachments on the inner sides of the pipelines and similarly inside the flow meter. With increasing deposits, the measuring accuracy of the Coriolis mass flow meter deteriorates. If the deposits even lead to a partial clogging of the measuring tube, the pressure in the pipelines and in the meter that is required for maintaining the desired flow rate must be increased. This effect is particularly critical in the food and drinks industrial sector, because an excessively increased pressure can adversely influence the quality of the products produced.

SUMMARY OF THE INVENTION

It is therefore an object of the invention to provide a method for operating a Coriolis mass flow meter and a Coriolis mass flow meter with which the undesired state of deposits in the measuring tube can be detected and which correspondingly make more reliable operation of the meter possible.

This and other objects and advantages are achieved by a Coriolis mass flow meter and a method for operating the Coriolis mass flow meter in which, for the detection of deposits in a measuring tube, a first indicator variable, which is based on the damping of the vibrations of a measuring tube, is initially used and, if an increased damping is established based on the first indicator variable, then a second indicator variable, which is based on the manifestation of at least one harmonic in the frequency spectrum of a vibration signal, is also used.

The invention is based on the realization that deposits in the measuring tube increase the damping of the vibrating system. However, this effect is similar to the known increase in frictional losses within two-phase flows. The ratio between the root mean square value, for example, of the first vibration signal and the drive power can be used to obtain a first indicator variable, which may be regarded as proportional to the damping. Furthermore, deposits are generally not distributed in an ideally homogenous manner on the inner wall of the pipe. The uneven mass distribution in the pipes causes harmonics, the manifestation of which can be evaluated by a spectral analysis of the vibration signals. Based on an evaluation in the frequency range, it can therefore be established whether deposits are the cause of an established increase in the damping.

The invention consequently has the advantage that it makes it possible to obtain a reliable finding concerning the presence of deposits in the measuring tube of the Coriolis mass flow meter. This has the effect of making it possible to perform what is known as condition monitoring, i.e., a monitoring of the state, both of the field device and of the process engineering installation in which the Coriolis mass flow meter is used as a field device. Apart from the detection of a possible measuring error, this provides the operator of the installation with valuable indications as to the state of its installation.

A further advantage can be seen in the fact that the diagnosis is based on signals that are already available in the evaluation electronics of a conventional Coriolis mass flow meter. Therefore, only signals that are in any case available in the mass flow meter are used for determining the indicator variables. The meter therefore advantageously does not have to be supplemented by additional hardware or additional sensor or actuator systems. As a result, the expenditure required to implement the invention is comparatively low. It is only necessary to supplement the software of the evaluation device of a conventional meter with additional algorithms for the detection of deposits. These can, however, be kept simple and require only a small part of the existing computing power. Moreover, there is advantageously also no necessity for interventions in a closed-loop control circuit, which is usually provided for controlling the vibrating system in Coriolis mass flow meters.

Furthermore, the detection of deposits can be performed largely independently of the pressure of the medium, the mass flow or the temperature. The robustness of the diagnosis in comparison with media with higher viscosity is also advantageous.

Since deposits form comparatively slowly, it is sufficient for the method of detection to be performed cyclically at predetermined time intervals.

The procedure for the detection of deposits may be regarded as a two-stage method. In the first stage, a first indicator variable is used based on the damping of the vibrations. If the damping is too high, an error is concluded. In this case, the second stage is used, in order to determine the type of error. Only in the second stage is a second indicator variable evaluated, based on the manifestation of harmonics, which is investigated with the aid of a frequency analysis. If at least one harmonic is intense in comparison with the background noise, deposits are present, otherwise there are possibly disturbances of some other kind. An advantage of this two-stage method sequence is that it saves computing power. This is so because, in the normal case, i.e., in the case where there are no errors, only the first indicator variable has to be determined. This may be performed, for example, by simple root mean square value calculations and calculating the quotient from the root mean square values determined. Only when an error is detected on account of an increased damping must a frequency analysis be additionally performed, in order to determine the type of error.

A value of the first indicator variable, which is based on the damping of the vibrations of the measuring tube, can in principle be determined in various ways. For example, it is possible to induce the measuring tube to vibrate by a pulse and to evaluate the decay of the vibrations. However, this would require a device for pulse excitation, which is not present in customary Coriolis mass flow meters.

Quite a considerable drive power already has to be produced for the excitation of the vibrating system in normal measuring operation when there is increased damping. Therefore, the drive power required for inducing the measuring tube to vibrate can advantageously be evaluated for determining the first indicator variable. The drive power is a physical variable that is comparatively simple to determine because, for example, when using a magnetic drive device, the applied current intensity is a known variable and only simple computational steps have to be performed to determine the drive power. For example, the drive power may be reproduced by the RMS (root mean square) value, which is also often referred to as the quadratic mean. It should be understood that a different measure of the magnitude of the drive signal may be used as an alternative to this method for determining the drive power.

The drive power is usually controlled by a closed-loop control circuit. As a result, alternatively to the drive power, the "driver gain" from the control circuit may be evaluated to determine the first indicator variable.

An increased damping with the same drive power is manifested by a reduction in the vibrational amplitude. Consequently, it is advantageously possible to evaluate the root mean square value of the first or second vibration signal or of a signal formed by linking these signals for determining the first indicator variable. These signals are in any case sensed in the Coriolis mass flow meter and no additional sensor systems of any kind are required to achieve this sensing.

If the quotient of the root mean square value of a vibration signal and the drive power is evaluated to determine the first indicator variable, this has the advantage that it is largely independent of the flow, and becomes all the smaller the greater the damping of the vibrating system is as a result of deposits. Error cases can be distinguished from the case without any errors by a simple comparison with a predetermined threshold value.

In the case where an error has been established based on the first indicator variable, the manifestation of harmonics in the frequency spectrum is evaluated to more accurately determine the cause of the error, i.e., for the detection of deposits. For the determination of the second indicator variable, which is based on these manifestations, the relative level of the frequency components of the background noise may be advantageously evaluated in comparison with the level of at least one harmonic. In this case, manifestation of the harmonic may be assessed in a particularly simple way by normalizing the frequency components determined in an evaluation window to the value of the frequency component of the harmonic and by subsequently determining the number of frequency components in the evaluation window of which the normalized value lies below a predeterminable threshold value. Such a procedure is distinguished by a particularly small computational effort. For determining the second indicator variable, the calculation of approximately 10 to 100 interpolation values as frequency components between two neighboring harmonics is then already sufficient. This procedure can be used for a number of harmonics, the number of which preferably does not exceed 10. The spectrum can therefore be subjected to a sliding, segmental normalization. The normalized spectrum thus obtained is subsequently evaluated, for example, by counting the number of frequency components that lie below the predetermined threshold. If the number is greater than a further predetermined threshold value, it can be concluded from this that the increased damping is caused by deposits in the measuring tube. If, on the other hand, the number is low, there is a different cause for the error, for example, a multiphase flow.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and also refinements and advantages are explained in more detail below on the basis of the drawings, in which an exemplary embodiment of the invention is represented and in which:

FIG. 1 shows a basic representation of a Coriolis mass flow meter; and

FIG. 2 shows a flowchart of the method in accordance with an embodiment of the invention.

DETAILED DESCRIPTION OF THE PREFERRED EMBODIMENTS

The Coriolis mass flow meter 1 depicted in FIG. 1 operates on the Coriolis principle. A first measuring tube 2 and a second measuring tube 3 are arranged substantially parallel to one another. They are usually made from one piece by bending. The path followed by the measuring tubes is substantially U-shaped. A flowable medium flows according to an arrow 13 into the mass flow meter 1, and thereby into the two inlet portions of the measuring tubes 2 and 3 located downstream of an inlet splitter, which cannot be seen in the figure, and according to an arrow 15 out again from the outlet portions and the outlet splitter located downstream thereof, which likewise cannot be seen in the figure. Flanges 14 and 16, which are respectively fixedly connected to the inlet splitter and the outlet splitter, serve for securing the mass flow meter 1 in a pipeline not represented in the figure. The geometry of the measuring tubes 2 and 3 is kept largely constant by a stiffening frame 4, so that even changes of the pipeline system in which the mass flow meter 1 is fitted, for example, caused by temperature fluctuations, lead at most to a minor shift of the zero point. An excitation system 23, which is symbolically represented in FIG. 1 and may comprise, for example, a magnetic coil that is secured on the measuring tube 2 and a magnet that is attached to the measuring tube 3 and plunges into the magnetic coil, serves for generating mutually opposed vibrations of the two measuring tubes 2 and 3, the fundamental frequency of which corresponds to the natural frequency of the substantially U-shaped middle portions of the measuring tubes 2 and 3. A pickup 24 and a pickup 25, the structure of which may correspond to that of the excitation system 23, serve for sensing the Coriolis forces and/or the vibrations of the measuring tubes 2 and 3 that are based on the Coriolis forces and are caused by the mass of the medium flowing through. The phase shift between the vibration signals 5 and 6, which are generated by the two pickups 24 and 25, respectively, is evaluated by an evaluation device 26 for calculating a measured value for the flow. The evaluation device 26 serves at the same time for activating the excitation system 23.

As a departure from the presently contemplated exemplary embodiment, it should be understood that the measuring tubes 2 and 3 may have different geometries, for example, a V-shaped or Q-shaped middle portion, or a different number and arrangement of excitation systems and pickups may be chosen. Alternatively, the Coriolis mass flow meter may have a different number of measuring tubes, for example, one measuring tube or more than two measuring tubes.

Various reference or threshold values that are used in accordance with embodiments of the method for operating the Coriolis mass flow meter 1 to detect deposits in the measuring tubes 2 and/or 3 are, for example, empirically determined during a calibration, initial operation or at another time during operation and are stored in a memory 27. With the aid of these threshold values, the evaluation device 26 determines, during the operation of the Coriolis mass flow meter 1, a diagnostic finding concerning the presence of deposits. The measured value of the mass flow and the diagnostic finding are output on a display 28 or transmitted over a field bus (not represented in FIG. 1) to a higher-level control station. If an error state is established as a result of deposits being present, suitable measures for further handling, such as a request for servicing personnel, may be instigated by the control station.

Based on the flowchart depicted in FIG. 2, the method for operating a Coriolis mass flow meter, with which deposits in the measuring tube can now be detected, is explained in more detail below. In the exemplary embodiment shown, the method is based on the evaluation of the excitation current IE, which is applied to the excitation system (reference sign 23 in FIG. 1) to induce the measuring tubes to vibrate, and based on the evaluation of a pickup voltage UP, which is sensed as a vibration signal (for example, reference sign 5 in FIG. 1) at a pickup (for example, reference sign 24 in FIG. 1). As an alternative to the use of only one vibration signal, it should be understood that both vibration signals or a signal formed by linking these signals may be included in the evaluation. The evaluation of the excitation current IE and the pickup voltage UP occurs with the aid of a microprocessor. Consequently, the originally analog signals are first converted into corresponding digital values by analog-digital converters 30 and 31, respectively. This does not represent any additional effort in comparison with conventional Coriolis mass flow meters, because conventional Coriolis mass flow meters usually use microprocessors to determine the mass flow and to control vabriations, and therefore require the signals be provided in a digital form. In a first stage of the method, the drive power required for generating the vibrations is calculated from the excitation current IE in a step S01 and the root mean square value of the picked-up vibration signal is calculated from the pickup voltage UP in a step S02. The quotient of the root mean square value and the drive power is formed in a step S03 and is compared with a first predetermined threshold value A in a step S04.

The calculated quotient represents a first indicator variable I1, which is based on the damping of the vibrations of the measuring tube. This is so because the calculated quotient is independent of the flow, and the smaller this quotient the greater the damping of the vibrating system has become on account of deposits. If the calculated quotient lies above the threshold value, i.e., the enquiry in step S04 yields the finding I1>A, the method is ended with step S05, in which the diagnostic finding is reached that no increased damping is established based on the first indicator variable I1, and consequently there is no error. Otherwise, i.e., if the enquiry in step S04 leads to the result I1<A, an increased damping is established and the second stage of the method is initiated, in which stage a second indicator variable I2, which is based on the manifestation of harmonics in the frequency spectrum, is also used for the detection of deposits. The second stage is required since the damping may also increase in the presence of other disturbances or process conditions, for example, when there is a multiphase flow or in the presence of cavitation. These cases can then be distinguished from the case of a deposit. If there is an uneven deposit along the tubes, clear manifestations of harmonics are detectable based on the uneven mass distribution. These can consequently be evaluated in a consideration of the spectrum for the detection of deposits. The second phase of the method begins for this with a step S06, in which the frequency spectrum of the pickup voltage UP is calculated, for example, with the aid of an FFT (fast Fourier transformation), with for example 1024 interpolation values. The frequency range considered is chosen such that the resonant frequency of the fundamental vibration of the vibrating system and preferably five to ten harmonics are contained. Based on the calculated frequency spectrum, a sliding segmental normalization is first performed in a step S07 to assess the manifestation of harmonics. In this case, the extent of the respective segments over which the normalization occurs is chosen to be somewhat greater than the substantially already known interval between neighboring harmonics, so that the extent is, for example, 1.5 times this interval. This ensures that frequency components of at least one harmonic are included in each segment. A "sliding" normalization is understood as meaning a normalization in which, for the calculation of the normalized frequency components, the segment with the frequency components respectively to be considered is shifted as in a "sliding" mean value formation. After performing the sliding segmental normalization, the harmonics in the frequency spectrum are at most at the level 1 and the respective ratio between the frequency component of a harmonic and the frequency components in the direct vicinity thereof remains unchanged. In a subsequent step S08, the normalized spectrum is evaluated by determining the number of interpolation points of the frequency spectrum of which normalized frequency components lie below a second predetermined threshold B which is, for example, set to the value 0.04. In a step S09, this number is compared with a third predetermined threshold value C, and is consequently used as a second indicator variable I2, which is based on the manifestation of harmonics in the frequency spectrum. If the determined number is greater than the predetermined third threshold value C which is set, for example, to the value 101, this means that, if the result of the comparison is I2>C, then there is a second indicator variable I2 that is characteristic of the presence of deposits, and the error state that deposits have been detected in the measuring tube is indicated in a step S10. Otherwise, i.e., in the case of the result I2<C, it is established that the second indicator variable I2 is not characteristic of the presence of deposits and it is indicated in a step S11 that there are no deposits but some other disturbance of the mass flow measurement.

The disclosed embodiments of the method for operating a Coriolis mass flow meter has been tried out in a series of tests, in which, in addition to the state without any errors, measurements were performed with chalk, wax and adhesive as deposited materials.

It was found thereby that the discloses embodiments of the method produce good results in the detection of deposits, in particular when they are distributed unevenly along the tubes and have reached a detectable minimum magnitude. The Coriolis mass flow meter in accordance with the disclosed exemplary embodiments can consequently provide important information for an operator of an installation concerning the state of its process engineering installation and the meters and pipelines used in the installation.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a Coriolis mass flow meter including at least one measuring tube which is flowed through by a medium, with at least two vibration pickups, spaced apart from one another along the at least one measuring tube, the method comprising:
    inducing the at least one measuring tube to vibrate such that a first vibration signal and a second vibration signal are generated by the at least two vibration pickups, respectively;
    utilizing a first indicator variable based on damping of the vibrations of the at least one measuring tube to detect increased damping in the at least one measuring tube; and
    utilizing a second indicator variable based on a manifestation of harmonics in a frequency spectrum of a vibration signal subsequent to use of the first indicator variable to detect deposits in the at least one measuring tube if the increased damping is established based on the first indicator variable.

2. The method as claimed in claim 1, further comprising:
    evaluating a drive power required for inducing the measuring tube to vibrate to determine the first indicator variable.

3. The method as claimed in claim 1, further comprising:
    evaluating a root mean square value of one of the first vibration signal, the second vibration signal, and a signal formed by linking the first and second vibration signals to determine the first indicator variable.

4. The method as claimed in claim 2, further comprising:
    evaluating a root mean square value of one of the first vibration signal, the second vibration signal, and a signal formed by linking the first and second vibration signals to determine the first indicator variable.

5. The method as claimed in claim 4, further comprising:
    evaluating a quotient of the root mean square value and the drive power to determine the first indicator variable.

6. The method as claimed in claim 1, further comprising:
    evaluating a relative level of frequency components of background noise in a frequency spectrum compared with a level of at least one harmonic to determine the second indicator variable.

7. The method as claimed in claim 6, further comprising:
    normalizing the frequency components of the background noise in an evaluation window to a value of the frequency component of the at least one harmonic; and
    determining a number of frequency components in the evaluation window of which the normalized value lies below a predeterminable threshold value is determined to evaluate the relative level of the background noise.

* * * * *